(12) United States Patent
Wang et al.

(10) Patent No.: US 8,968,821 B2
(45) Date of Patent: Mar. 3, 2015

(54) APPARATUS AND METHOD FOR APPLYING ALIGNMENT LIQUID AND SPACERS

(75) Inventors: Jing Wang, Beijing (CN); Chun Bae Park, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 1999 days.

(21) Appl. No.: 11/947,079

(22) Filed: Nov. 29, 2007

(65) Prior Publication Data

US 2008/0124487 A1    May 29, 2008

(30) Foreign Application Priority Data

Nov. 29, 2006   (CN) .......................... 2006 1 0144200

(51) Int. Cl.
  *B05D 5/00*   (2006.01)
  *G02F 1/1339*   (2006.01)

(52) U.S. Cl.
  CPC .................................. *G02F 1/13392* (2013.01)
  USPC .......................................................... 427/64

(58) Field of Classification Search
  USPC ....................................................... 427/71, 73
  See application file for complete search history.

(56) References Cited

U.S. PATENT DOCUMENTS

| | | | | |
|---|---|---|---|---|
| 5,594,570 | A * | 1/1997 | Hirata et al. | 349/129 |
| 5,818,560 | A * | 10/1998 | Kouno et al. | 349/129 |
| 5,967,577 | A | 10/1999 | Bhandarkar et al. | |
| 6,027,772 | A * | 2/2000 | Han | 428/1.1 |
| 6,696,114 | B1 * | 2/2004 | Kawatsuki et al. | 428/1.2 |
| 2003/0098943 | A1 * | 5/2003 | Park et al. | 349/155 |
| 2006/0260749 | A1 | 11/2006 | Ueda et al. | |
| 2006/0263920 | A1 * | 11/2006 | Kim et al. | 438/30 |
| 2007/0246707 | A1 | 10/2007 | Deng | |
| 2007/0272926 | A1 | 11/2007 | Deng | |
| 2007/0298554 | A1 | 12/2007 | Long | |
| 2008/0030639 | A1 | 2/2008 | Qiu | |
| 2008/0061295 | A1 | 3/2008 | Wang | |
| 2008/0100766 | A1 | 5/2008 | Ming | |
| 2008/0105873 | A1 | 5/2008 | Wang | |
| 2008/0105874 | A1 | 5/2008 | Wang | |
| 2008/0111136 | A1 | 5/2008 | Qiu | |
| 2008/0111934 | A1 | 5/2008 | Wu | |
| 2008/0117347 | A1 | 5/2008 | Zhang | |
| 2008/0123007 | A1 | 5/2008 | Cui | |
| 2008/0123030 | A1 | 5/2008 | Song | |
| 2008/0142802 | A1 | 6/2008 | Qiu | |
| 2008/0142819 | A1 | 6/2008 | Liu | |
| 2008/0164470 | A1 | 7/2008 | Wang | |
| 2008/0166838 | A1 | 7/2008 | Long | |

FOREIGN PATENT DOCUMENTS

| | | |
|---|---|---|
| CN | 1095824 A | 11/1994 |
| CN | 1865496 A | 11/2006 |
| JP | 9-203905 | 8/1997 |
| JP | 09-203905 | 8/1997 |
| JP | 2002-60517 | 2/2002 |

OTHER PUBLICATIONS

U.S. Appl. No. 12/104,575, filed Apr. 17, 2008, Xinxin Li.

* cited by examiner

*Primary Examiner* — Robert Vetere
(74) *Attorney, Agent, or Firm* — Hasse & Nesbitt LLC; Daniel F. Nesbitt

(57) ABSTRACT

An apparatus for spraying spacers with an alignment liquid, including a container for transporting the alignment liquid mixed with the spacers therein and a plurality of nozzles provided on a bottom of the container. The alignment liquid with spacers mixed therein is sprayed through the plurality of nozzles under a same inner pressure, thereby forming an alignment layer on the substrate supported.

13 Claims, 4 Drawing Sheets

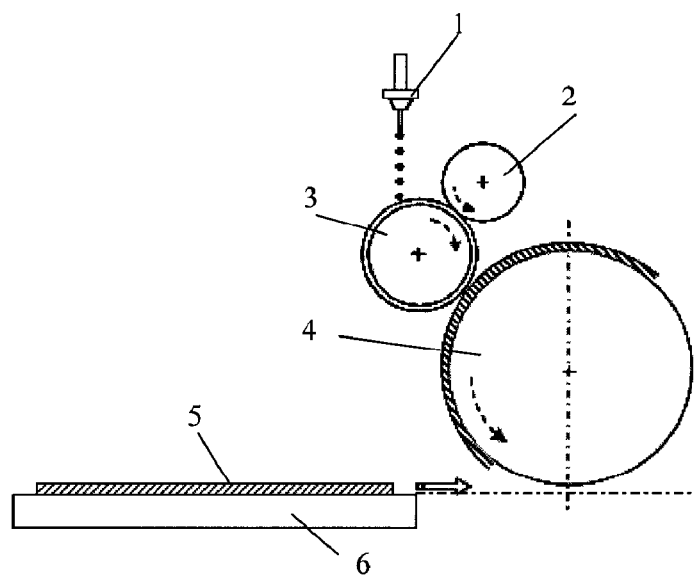
Figure 1 – Prior art
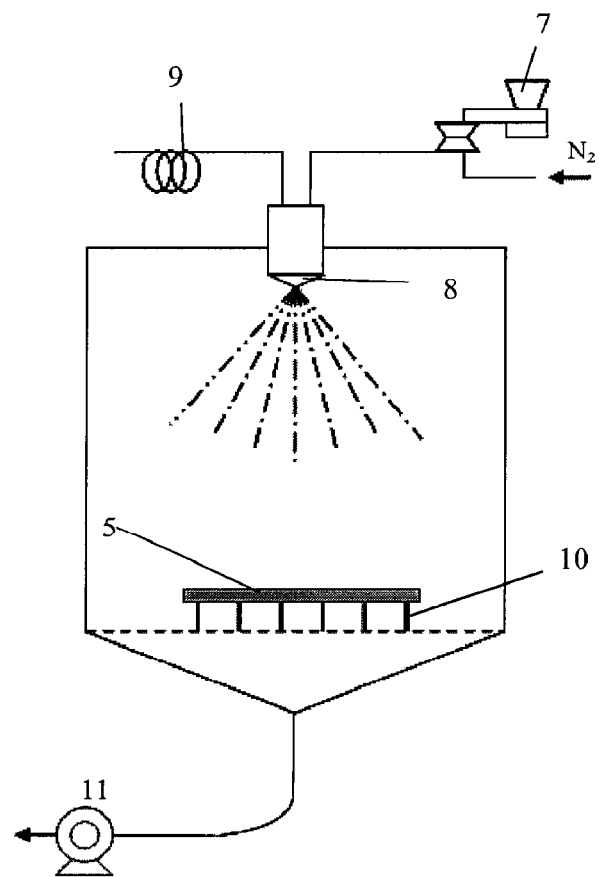
Figure 2 – Prior art

APPARATUS AND METHOD FOR APPLYING ALIGNMENT LIQUID AND SPACERS

BACKGROUND OF THE INVENTION

The present invention relates to an apparatus and a method for manufacturing liquid crystal display (LCD), and in particularly, to an apparatus and a method for applying an alignment liquid and spacers in manufacturing LCD.

With the rapid progress of information technology, the thin film transistor liquid crystal display (TFT LCD) is replacing the cathode ray tube (CRT) display to be the mainstream in the market. Meantime, the glass substrate for the TFT LCD is also becoming larger in dimension, which brings more challenge to the processing of the substrate.

In a conventional manufacturing process for the LCD, an alignment layer forming liquid (hereafter referred to as "alignment liquid") is generally applied with a transfer printing method. As shown in FIG. 1, the alignment liquid is first introduced onto a rotating anilox roller 3 from a nozzle 1, and the alignment liquid is further uniformly coated onto a transfer printing roller 4 with the assistance of a doctor roll 2. The roller 4 is rotated and subsequently brought into contact with a glass substrate 5 disposed on a stage 6 under a certain pressure, so that the alignment liquid coated on the roller 4 is transferred onto the glass substrate 5. After transferring of the alignment liquid, the formed alignment layer is mechanically rubbed with a rubbing device so as to have a uniform arrangement and predetermined orientation.

After the alignment layer is prepared, spacers are distributed, for example, by a dry distributing method on the glass substrate 5 for maintaining a uniform thickness of the crystal layer of the LCD, and then an assembling process of the substrates is performed. As shown in FIG. 2, after filtered in a filter device 7, spacers are delivered to a spray head 8, during which course the spacers are charged with same polar charge to avoid agglomeration of the spacers in spraying. The spacers are sprayed onto the glass substrate 5 loaded on a support 10 through the spray head 8 with a certain gas pressure. The gas and spacers outside the glass substrate 5 are discharged outside through a gas pump 11.

However, there exist several intrinsic disadvantages in the related art, such as difficulty to maintain a uniform thickness of the alignment layer, scratches, particle contamination, electrostatic discharge damages, etc., which tend to occur during rubbing on the alignment layer. Further, the dry distributing method brings problems of uneven distribution and agglomeration of the spherical spacers. In addition, as the size of the glass substrate becomes larger, the problems are more apparent. A method for spraying spacers with the alignment liquid is disclosed, for example, in Chinese patent application No. 93106295.0, which solves the problem of spacers agglomeration and simplifies the manufacturing process. However, the method, which makes use of a high speed rotating stage, is difficult to obtain a uniform thickness of the alignment layer and also is prone to contaminate the apparatus. Also, in the method, the subsequent rubbing process tends to move the spacers, and the alignment layer may not be rubbed in a uniform manner. These problems if not controlled properly will greatly degrade the image quality of the LCD, leading to light leakage and brightness uniformity. Thus, there is a need to improve the manufacturing process.

SUMMARY OF THE INVENTION

Therefore, in view of the above problems of the related art, the present invention is conceived to provide an apparatus for applying an alignment liquid and spacers and a method therefor.

According to an aspect of the invention, there is provided an apparatus for applying an alignment liquid and spacers, comprising a container for transporting the alignment liquid mixed with the spacers therein and a plurality of nozzles provided on a bottom of the container.

Preferably, the apparatus may further comprise a feeding pipe connected to the container, a support disposed under the plurality of nozzles, and a discharge pipe disposed below the support.

Preferably, each of the nozzles may have a mesh structure.

Preferably, the plurality of nozzles may have the same configuration and be arranged in a single row with equal intervals between neighboring nozzles.

Preferably, the plurality of nozzles may have the same configuration and be arranged in two or more rows with equal intervals between neighboring nozzles in a same row.

According to another aspect of the invention, there is provided a method for applying an alignment liquid and spacers to a substrate, comprising step 1 of spraying the alignment liquid with spacers mixed therein through a plurality of nozzles under a same inner pressure, thereby forming an alignment layer on the substrate supported.

Preferably, the method may further comprise step 2 of preheating the resulting substrate of step 1 to form a solid-state alignment layer in a film so that the spacers are uniformly distributed and adhered to the alignment layer.

Preferably, the method may further comprise step 3 of exposing the alignment layer on the substrate to an inclined linearly-polarized light to realize orientation in the alignment layer.

Preferably, the method may further comprise step 4 of baking the resulted substrate of step 3.

Preferably, the alignment liquid in step 1 may be prepared by using N-methyl-2-Pyrrolidinone (NMP) as a thinner applied to mixture of vinylcinnamate and polyimide (PI). The volume ratio of vinylcinnamate to PI may be 95:5.

Preferably, the linearly-polarized light in step 3 may be a linearly-polarized UV light. The inclined linearly-polarized light may be illuminated onto the alignment layer in parallel to a direction of a pre-tilt angle of the alignment layer.

Preferably, the exposing may be performed with a mask plate with a pattern formed of opaque material, such as chromium (Cr) or black dying.

Compared with the conventional method, a plurality of nozzles are employed, and the nozzles with same configuration may be disposed in a straight line in a single row or in a different (two or more) rows with equal intervals therebetween in a same row. Each of nozzles may have a mesh configuration such that the alignment liquid may be uniformly diffused in spray. In addition, the parameters such as the mesh size, the nozzle height above the substrate, the interval between neighboring nozzles, etc. may be optimized as needed such that spacers are distributed uniformly without agglomeration.

Meantime, according to the present invention, the process flow is simplified and thus the process period is shortened due to merging the coating of alignment liquid and the spraying of spacers.

In addition, problems such as scratches to the alignment layer, particle contaminations, electrostatic discharge damage, and others, which often occur in the rubbing process of the conventional method, can be avoided without a rubbing process in the embodiment of the invention. Instead, a light induced orientation method may be employed, and anisotropy photopolymerization is carried out in the alignment layer in the display region of the substrate, thus causing uniform orientation in the alignment layer.

The apparatus and method of the embodiment of the present invention can promote the uniform distribution of the spherical spacers and avoid agglomeration of the spacers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein:

FIG. 1 is a schematic diagram showing coating alignment liquid in a conventional method.

FIG. 2 is a schematic diagram showing spacer spraying in the conventional method.

DETAILED DESCRIPTION OF THE PREFERRED EMBODIMENTS

Exemplary embodiments of the present invention will be described hereinafter with reference to the accompanying drawings. It should be understood that in this description when a layer or an element is referred to as being "on" or "connected to" another layer or element, this layer or element can be directly on or directly connected to the other layer or element, or an intervening layer may also be present.

Figure 3:
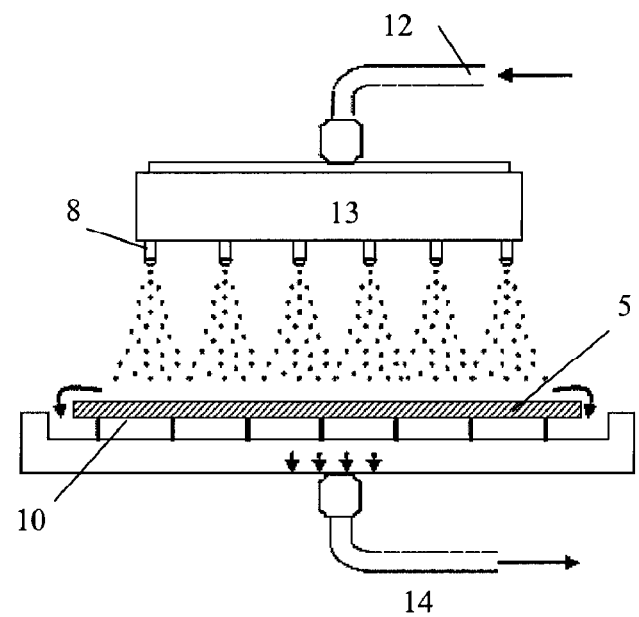
FIG. 3 is a schematic diagram showing an apparatus for spraying spacers with alignment liquid spacers according to an embodiment of the present invention.

FIG. 3 is a schematic diagram showing an apparatus for spraying spacers with alignment liquid according to an embodiment of the present invention. The apparatus comprises a feeding pipe 12, a container 13, a plurality of nozzles 8 provided on the bottom surface of the container 13, a support 10 disposed under the plurality of nozzles 8, a discharge pipe 14 disposed below the support 10.

The operation of the apparatus of the embodiment is described below. A glass substrate 5 is loaded on the support 10. Photosensitive alignment liquid mixed with spacers such as spherical spacers is delivered to the container 13 through the feeding pipe 12, and is then transported and sprayed uniformly through the nozzles 8 under a same inner pressure, so that a uniform alignment layer is formed on the glass substrate 5. Extra alignment liquid is collected and discharged through the discharge pipe 14.

Figure 4:
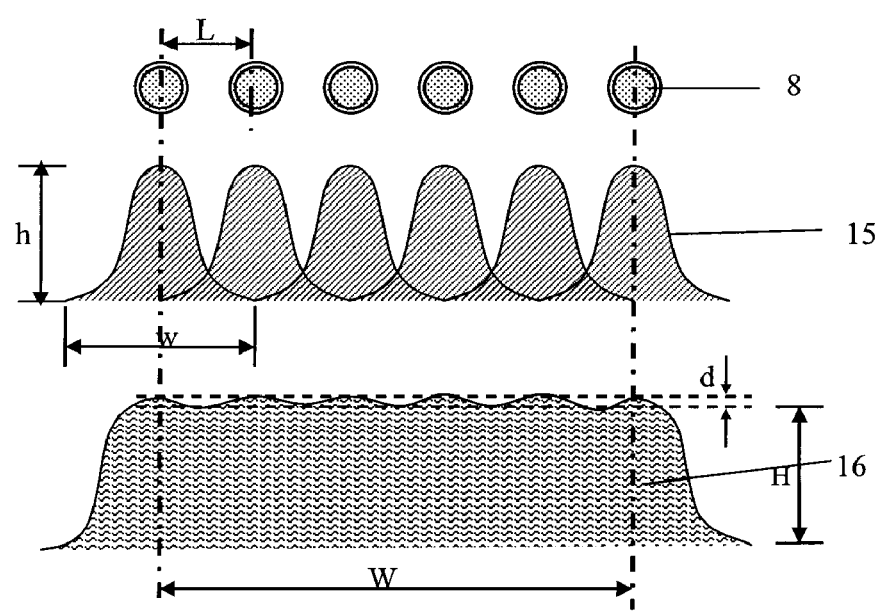
FIG. 4 is a schematic diagram showing one exemplary nozzle configuration according to the embodiment of the present invention.

FIG. 4 is a schematic diagram showing one exemplary configuration of the nozzles 8 according to the embodiment of the present invention. In this exemplary configuration, the nozzles 8 have the same configuration such as caliber size, and are disposed in a straight line in a single row with equal intervals therebetween. Each of nozzles 8 has a mesh structure such that the alignment liquid can be uniformly distributed in spraying. A curve 15 in FIG. 4 denotes a spraying profile of each nozzle, where "w" denotes a spraying width of the alignment liquid applied on the substrate by each nozzle, "h" denotes the largest spraying amount applied on the substrate by each nozzle. In addition, "L" denotes an interval between the neighboring nozzles. A curve 16 in FIG. 4 denotes a collective spraying profile of the nozzles, where "W" denotes a spraying width of the alignment liquid applied on the substrate by the nozzles, "d" denotes the variation of liquid amount applied across the spraying scope by the nozzles, and H denotes a spraying amount on the substrate by the nozzles. W is preferably equal or greater than the width of the substrate. The ratio of w to h can be tuned by adjusting the height of the nozzle above the substrate, while the spraying profile curve 15 of a single nozzle can be tuned by adjusting the size of mesh structure of the nozzle. The value of H may be tuned by adjusting L. The value of d should be made as small as possible to achieve a uniform alignment layer thickness and a uniform spacer distribution. A preferred result can be obtained by optimizing the parameters of the apparatus such as mesh size, the nozzle height above the substrate, the interval between neighboring nozzles. In such optimized condition, spacers can be distributed uniformly as well without agglomeration of spacers.

Figure 5:
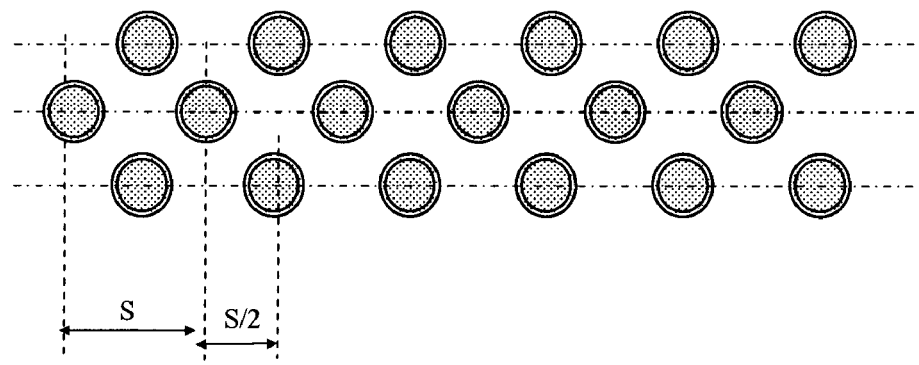
FIG. 5 is a schematic diagram showing exemplary nozzle configuration according to the embodiment of the present invention.

FIG. 5 is a schematic diagram showing another exemplary configuration of the nozzles according to the embodiment of the present invention. In this exemplary configuration, nozzles with same configuration such as caliber size are disposed in a straight line in different (two or more) rows with equal intervals therebetween in each row. S denotes the interval between the neighboring nozzles in each row, while S/2 denotes the interval between the neighboring nozzles in the adjacent rows. Same as the configuration of FIG. 4, a uniform alignment layer thickness and a uniform spacer distribution can be achieved by optimizing the parameters of the configuration of the apparatus.

Hereinafter a method for applying the alignment liquid and spacers according to the embodiment of the present invention is described in more detailed.

First, as shown in FIG. 3, one or more glass substrates 5 are loaded on the support 10. Vinylcinnamate and polyimide are mixed in a certain ratio and added in N-methyl-2-Pyrrolidinone (NMP) as a thinner so as to prepare the alignment liquid. In one embodiment, the volume ratio of vinylcinnamate to polyimide is 95:5, for example. After spacers are mixed in the alignment liquid uniformly, the alignment liquid is delivered to the container 13 through the feeding pipe 12, and is sprayed uniformly through the plurality of nozzles 8 provided on the bottom of the container 13 under a same inner pressure, so that a uniform alignment layer is formed on the substrate 5. Extra alignment liquid is collected and discharged by discharge pipe 14.

Figure 6:
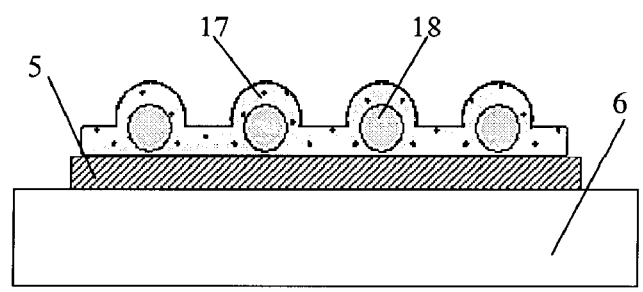
FIG. 6 is a schematic diagram showing the state of the alignment liquid and spacers after spraying according to the embodiment of the present invention.

In the step, the alignment liquid is uniformly mixed with the spacers and sprayed onto the surface of the substrate 5 using the plurality of nozzles 8, in which the applying of the alignment liquid and the spraying of spacers is performed simultaneously. As the spacers 18 have larger specific gravity than the alignment liquid, the spacers 18 tend to fall and precipitate and be surrounded by the alignment layer 17 while the alignment liquid is applied onto the surface of the substrate. FIG. 6 shows the state of the alignment liquid and spacers be applied onto the surface of the substrate 5.

In the step, the process flow is simplified and thus the period is shortened due to merging the coating of alignment liquid and the spraying of spacers.

Next, the alignment liquid on the substrate is preheated to form an alignment layer. The alignment liquid is transformed into a solid-state alignment layer in a film through a preheat treatment. With the preheat treatment, spacers can be uniformly distributed and strongly adhered to the surface of the substrate.

Figure 7:
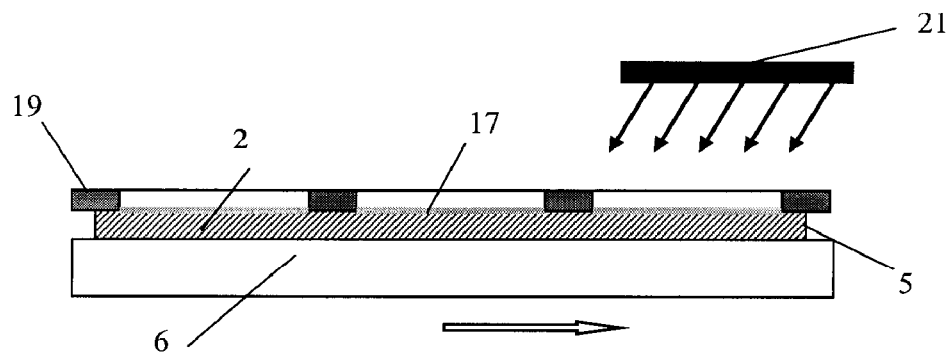
FIG. 7 is a schematic sectional view showing a light induced orientation process according to the embodiment of the present invention.
Figure 8:
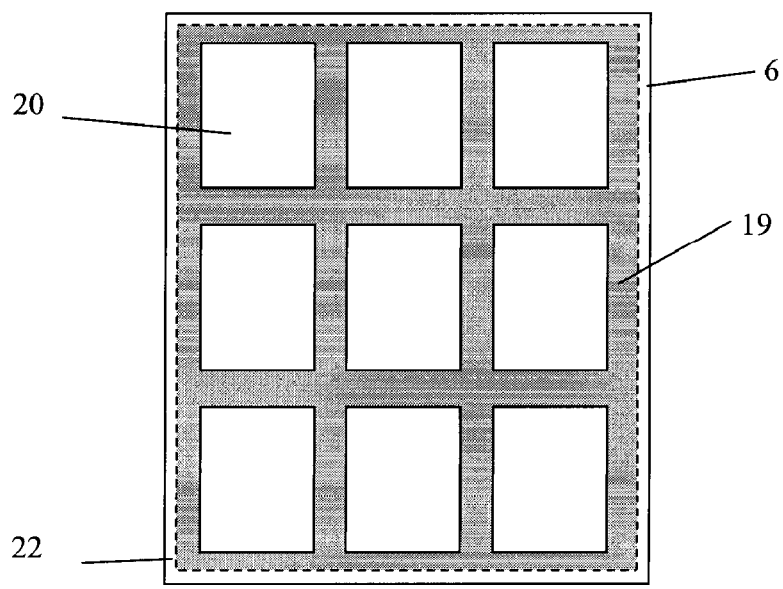
FIG. 8 is a schematic plan view showing the alignment of the mask plate and the substrate in the embodiment of the present invention.

Next, as shown in FIGS. 7 and 8, a mask plate 19 is placed above the glass substrate 5 supported on a stage 6 and aligned with the substrate 5 with alignment marks 22. Masked with the mask plate 19, the alignment layer 17 is illuminated with a linearly-polarized light such as an ultra-violet (UV) light at an inclined angle (in a direction parallel to the direction of a pre-tilt angle) such that anisotropy photopolymerization is triggered and carried out in the alignment layer 17 in the display region 20 of the substrate 5, resulting in uniform orientation of the molecules in the alignment layer.

Finally, thus resulted substrate is baked, for example, under a high temperature, to remove the remaining solvent.

In the above process, the photosensitive alignment liquid is prepared by using NMP as a thinner for the mixture of vinylcinnamate and polyimide (PI), with the volume ratio of vinylcinnamate to PI of 95:5, for example. Vinylcinnamate is a photopolymerization orientation material, but it is poor in stability and difficult to control the pre-tilt angle. With addition of PI into vinylcinnamate, thermal stability is improved, and also the pre-tilt angle is increased with the increase of PI amount. Thus, by illuminating the alignment layer with a linear polarized UV light in the direction of the pre-tilt angle, grooves in a predetermined direction are formed on the surface of the alignment layer without mechanical rubbing.

In addition, since the spacers 18 in the alignment liquid fall down to the surface of the substrate 5 under gravity and are enclosed by the alignment liquid, the substrate with the alignment layer may be preheated for a period of certain time prior to exposing to UV light so as to remove water in the mixture liquid and form an alignment layer in a thin film. Otherwise, spacer movement and alignment non-uniformity may occur when the substrate is transported.

Furthermore, the substrate is exposed to UV light when masked with a mask plate such that certain orientation arises in the display region rather than in the other regions on the substrate. The illumination direction of the UV light may be substantially in parallel to the pre-tilt angle to achieve the desired effect on the orientation of the alignment layer.

Although the present invention has been described in detail referring to the preferred embodiments, the above embodiments are used only for illustration and not for the purpose of limitation. Accordingly, it will be understood by those of ordinary skill in the art that it is possible to use other materials and equipments if necessary, and that various modifications or equivalent alterations may be made to the embodiments of the present invention without departing from the spirit and scope of the present invention as set forth in the following claims.

What is claimed is:

1. A method for applying an alignment liquid and spacers to a substrate, comprising:
    step 1 of spraying the alignment liquid with spacers mixed therein through a plurality of nozzles under a same inner pressure, thereby forming an alignment layer on the substrate supported;
    step 2 of preheating the resulted substrate of step 1 to form a solid-state alignment layer in a film so that the spacers are uniformly distributed and adhered to the alignment layer; and
    step 3 of exposing the alignment layer on the substrate to an inclined linearly-polarized light to realize orientation in the alignment layer without requiring a rubbing process.

2. The method of claim 1, further comprising step 4 of baking the resulted substrate of step 3.

3. The method of claim 2, wherein:
    the alignment liquid in step 1 is prepared by using N-methyl-2-Pyrrolidinone (NMP) as a thinner applied to the mixture of vinylcinnamate and polyimide (PI).

4. The method of claim 3, wherein the volume ratio of vinylcinnamate to PI is 95:5.

5. The method of claim 2, wherein the linearly-polarized light used in step 3 is linearly-polarized UV light.

6. The method of claim 2, wherein the inclined linearly-polarized light is illuminated in parallel to a direction of a pre-tilt angle of the alignment layer.

7. The method of claim 2, wherein the exposing to the inclined linearly-polarized light is performed with a mask plate with a pattern.

8. The method of claim 1, wherein:
    the alignment liquid in step 1 is prepared by using N-methyl-2-Pyrrolidinone (NMP) as a thinner applied to mixture of vinylcinnamate and polyimide (PI).

9. The method of claim 8, wherein the volume ratio of vinylcinnamate to PI is 95:5.

10. The method of claim 1, wherein the linearly-polarized light used in step 3 is a linearly-polarized UV light.

11. The method of claim 1, wherein the inclined linearly-polarized light is illuminated onto the alignment layer in parallel to a direction of a pre-tilt angle of the alignment layer.

12. The method of claim 1, wherein the exposing to the inclined linearly-polarized light is performed with a mask plate with a pattern.

13. The method according to claim 1 wherein a spraying width of the alignment liquid applied on the substrate by the plurality of nozzles is equal or greater than the width of the substrate.

* * * * *